(12) United States Patent
Jain

(10) Patent No.: US 8,720,182 B2
(45) Date of Patent: May 13, 2014

(54) INTEGRATED VARIABLE AREA NOZZLE AND THRUST REVERSING MECHANISM

(75) Inventor: Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 850 days.

(21) Appl. No.: 12/439,897

(22) PCT Filed: Oct. 12, 2006

(86) PCT No.: PCT/US2006/039791
§ 371 (c)(1),
(2), (4) Date: Mar. 4, 2009

(87) PCT Pub. No.: WO2008/045048
PCT Pub. Date: Apr. 17, 2008

(65) Prior Publication Data
US 2010/0269485 A1    Oct. 28, 2010

(51) Int. Cl.
F02K 1/72    (2006.01)
(52) U.S. Cl.
USPC ........... 60/226.2; 60/230; 60/771; 244/110 B; 239/265.19; 239/265.29
(58) Field of Classification Search
USPC ................ 60/204, 226.2, 226.3, 230, 771; 244/110 B; 239/265.19, 265.25, 265.29
See application file for complete search history.

(56) References Cited

U.S. PATENT DOCUMENTS

| | | | | |
|---|---|---|---|---|
| 2,950,595 A | * | 8/1960 | Laucher et al. | 239/265.31 |
| 3,262,269 A | * | 7/1966 | Kutney et al. | 60/226.2 |
| 3,280,561 A | * | 10/1966 | Kutney | 60/226.2 |
| 3,614,037 A | * | 10/1971 | Vdolek | 244/110 B |
| 3,647,141 A | * | 3/1972 | Murday | 239/265.29 |
| 4,485,970 A | | 12/1984 | Fournier et al. | |
| 4,513,567 A | * | 4/1985 | Deveau et al. | 60/782 |
| 4,865,256 A | | 9/1989 | Durand et al. | |
| 5,040,730 A | * | 8/1991 | Hogie et al. | 239/265.23 |
| 5,706,649 A | * | 1/1998 | Robinson et al. | 60/226.2 |
| 5,778,659 A | * | 7/1998 | Duesler et al. | 60/226.1 |
| 5,782,431 A | * | 7/1998 | Gal-Or et al. | 244/52 |
| 5,833,140 A | * | 11/1998 | Loffredo et al. | 239/265.37 |
| 5,893,265 A | * | 4/1999 | Gonidec et al. | 244/110 B |
| 6,050,522 A | * | 4/2000 | Brossier et al. | 244/110 B |
| 6,748,744 B2 | * | 6/2004 | Peplow et al. | 60/773 |
| 6,968,675 B2 | | 11/2005 | Ramlaoui et al. | |

FOREIGN PATENT DOCUMENTS

WO    WO2004036020 A2    4/2004

OTHER PUBLICATIONS

Jane's Aero-Engines, Issue Seven, edited by Bill Gunston, Jane's Information Group Limited, Alexandria, VA, 2000, p. 8.*
Search Report and Written Opinion mailed on Jun. 15, 2007 for PCT/US2006/039791.
Notification of Transmittal of The International Preliminary Report on Patentability mailed on Nov. 7, 2008 for PCT/US2006/039791.
Extended European Search report dated Nov. 3, 2011.

* cited by examiner

Primary Examiner — William H Rodriguez
Assistant Examiner — Lorne Meade
(74) Attorney, Agent, or Firm — Carlson, Gaskey & Olds, P.C.

(57) ABSTRACT

A variable area fan nozzle for use with a gas turbine engine system includes a nozzle having a cross-sectional area associated with a discharge air flow from a fan bypass passage. The nozzle is selectively moveable between multiple static positions for varying the cross-sectional area and multiple thrust reverse positions that are different from the static positions for reversing a direction of the discharge flow from the fan bypass passage to produce a thrust reversing force.

9 Claims, 2 Drawing Sheets

INTEGRATED VARIABLE AREA NOZZLE AND THRUST REVERSING MECHANISM

BACKGROUND OF THE INVENTION

This invention relates to gas turbine engines and, more particularly, to a gas turbine engine having a variable area fan nozzle for controlling thrust reversal of the gas turbine engine.

Gas turbine engines are widely known and used for power generation and vehicle (e.g., aircraft) propulsion. A typical gas turbine engine includes a compression section, a combustion section, and a turbine section that utilize a primary airflow through the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle upon landing, such as an aircraft. One type of conventional thrust reverser utilizes a moveable cowl mounted near the rear of the nacelle. After touch-down of the aircraft for landing, the cowl moves aft and radially inward from a stowed position to a position aft of the outlet of the bypass airflow passage to block the bypass airflow. In this position, the cowl deflects the bypass airflow in a forward direction to produce the thrust reversing force. Although effective, this and other conventional thrust reversers have only a single thrust reversal position and, therefore, have the disadvantage of providing only limited control over the amount of thrust reversing force. Moreover, when not in use during landing, the thrust reversers do not provide additional functions when in the stowed position. Therefore, there is a need for a thrust reverser that provides more control over the thrust reversing force and additional functionality outside of landing.

SUMMARY OF THE INVENTION

An example variable area fan nozzle for use with a gas turbine engine system includes a nozzle having a cross-sectional area associated with a discharge air flow from a fan bypass passage. The nozzle is selectively moveable between multiple static positions for varying the cross-sectional area and multiple thrust reverse positions that are different from the static positions for reversing a direction of the discharge flow from the fan bypass passage. For example, the nozzle includes two sections that are independently moveable among the thrust reverse positions to provide a variety of different thrust reversing forces.

In another aspect, a gas turbine engine system incorporates the example variable area fan nozzle. For example, the gas turbine engine system includes a nacelle, a gas turbine engine within the nacelle, a fan bypass passage between the nacelle and the gas turbine engine, the variable area fan nozzle, and a controller for selectively moving the nozzle responsive to an operational state of the gas turbine engine, such as an aircraft cruise condition or landing condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
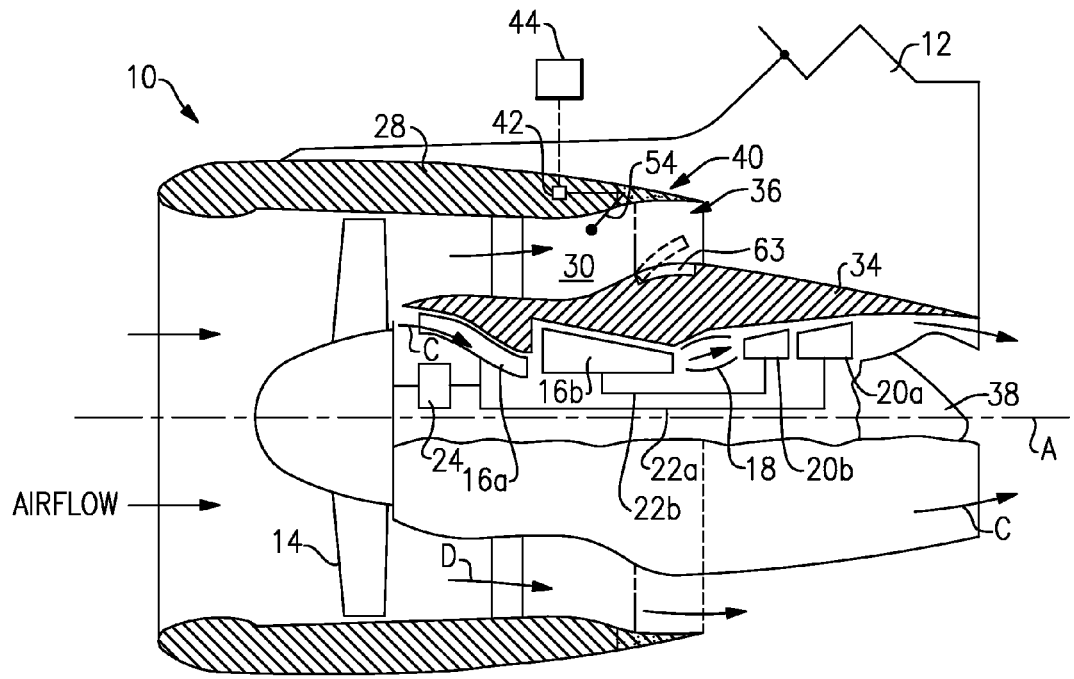
FIG. 1 illustrates selected portions of an example gas turbine engine system having a variable area fan nozzle.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 can be any known gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle or fan cowl) extends circumferentially about the fan 14. A fan bypass passage 30 extends between the nacelle 28 and an inner housing, inner cowl 34, which generally surrounds the compressors 16a, 16b, turbines 20a, 20b, and combustor section 18.

In operation, the fan 14 draws air into the gas turbine engine 10 as a core flow, C, and into the bypass passage 30 as a bypass air flow, D. A rear exhaust 36 discharges the bypass air flow D from the gas turbine engine 10. The core flow C is discharged from a passage between the inner cowl 34 and a tail cone 38.

The example gas turbine engine 10 shown FIG. 1 also includes a nozzle 40 (shown schematically) associated with the bypass passage 30. In this example, the nozzle 40 is shown near the trailing end of the nacelle 28, as an exhaust or exit nozzle. However, the nozzle 40 need not be an exhaust/exit nozzle. For example the functions and mechanical arrangement of the nozzle 40, as will be described, could be integrated into the nacelle 28 at any axial location aft of the fan 14.

In the illustrated example, the nozzle 40 is coupled to the nacelle 28. Alternatively, the nozzle 40 is coupled with the inner cowl 34, or other structural portion of the gas turbine engine 10.

The nozzle 40 is operatively connected with actuators 42 for movement between a plurality of positions to influence the bypass air flow D, such as to manipulate an air pressure of the bypass air flow D. A controller 44 commands the actuators 42 to selectively move the nozzle 40 among the plurality of positions to manipulate the bypass air flow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In the illustrated example, the nozzle 40 is coupled to the nacelle 28 and includes hinges 54 (one shown) for moving the nozzle 40, or sections of the nozzle 40, about the hinges 54. Although the exemplary nozzle 40 is shown with hinges 54, other suitable mechanisms for moving or pivoting the nozzle 40 may be used.

Figure 2:
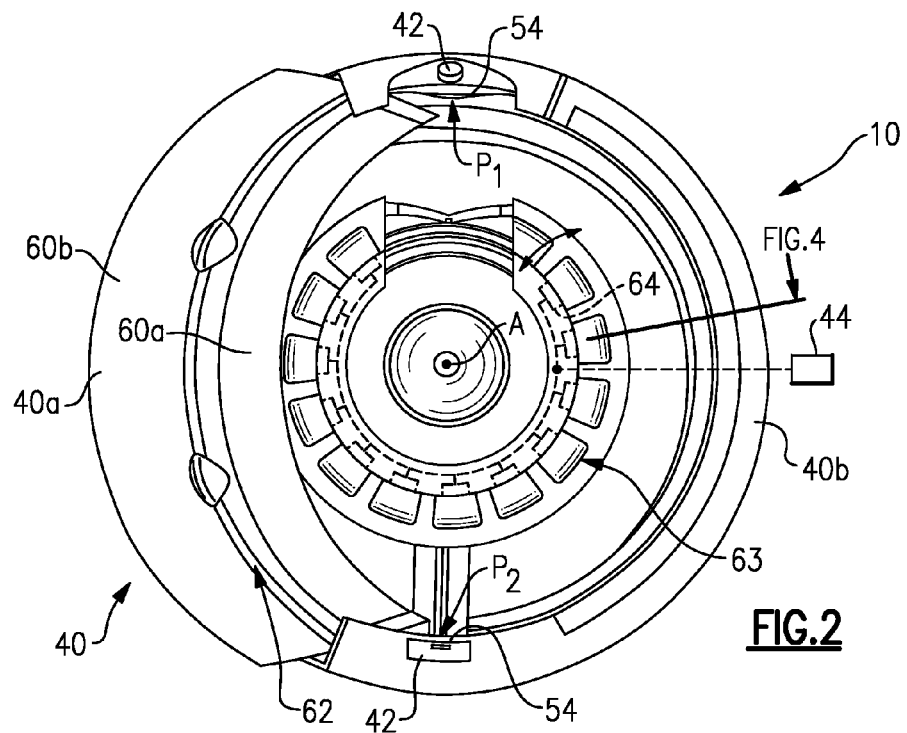
FIG. 2 illustrates an axial view of a section of the variable area fan nozzle in a thrust reverse position.
Figure 3:
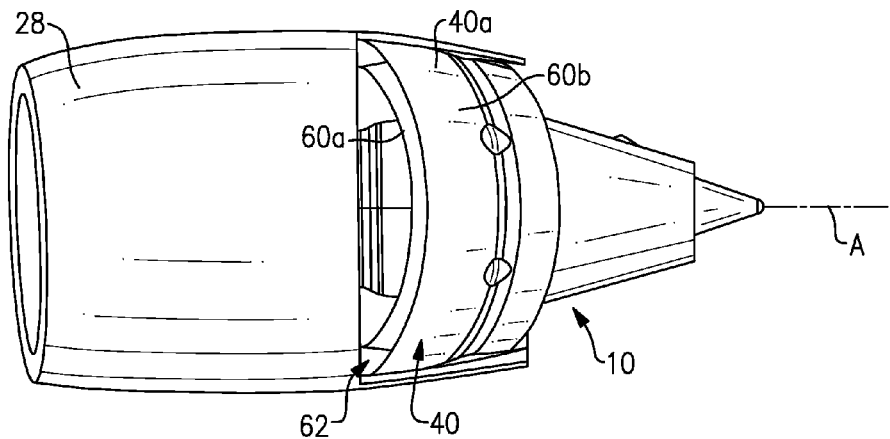
FIG. 3 illustrates a side view of the section of the variable area fan nozzle in a thrust reverse position.

Referring to FIGS. 2 and 3, the nozzle 40 in this example includes two sections 40a and 40b that are moveable between different positions, independently of each other. In this example, each section 40a and 40b comprises about half of the circumference of the rear exhaust 36. The sections 40a and 40b pivot about pivot points $P_1$ and $P_2$, which are located diametrically opposite from each other. Given this description, one of ordinary skill in the art will recognize that the nozzle 40 may alternatively include more sections than shown in this example to meet the particular needs of an implementation.

Each of the two sections 40a and 40b includes an inner wall 60a and an outer wall 60b, relative to the centerline axis A. The inner wall 60a is spaced apart from the outer wall 60b to define a passage there between that partially diverts a portion of the bypass airflow D.

Figure 4:
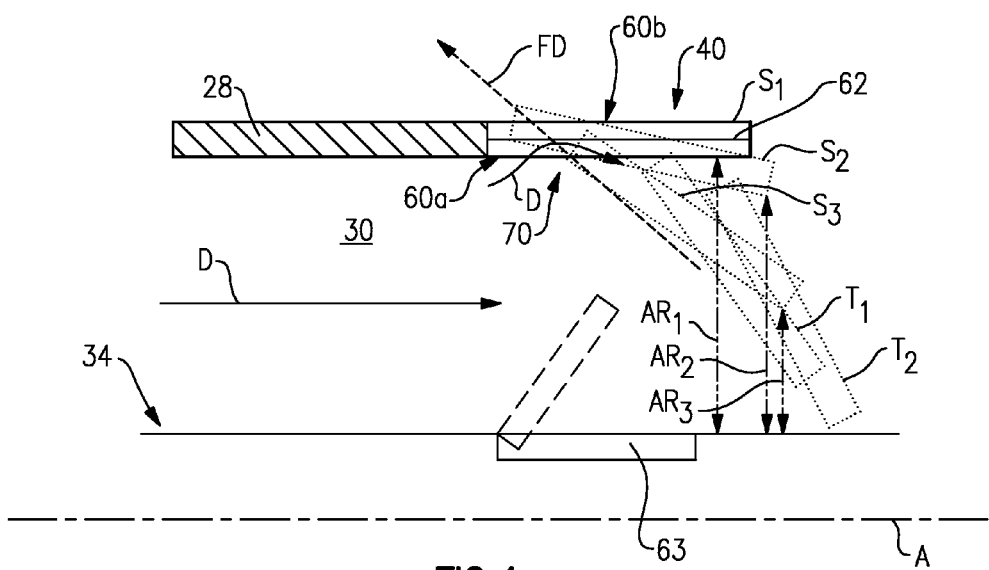
FIG. 4 illustrates different static positions and thrust reverse positions of an example variable area fan nozzle.

Referring to the schematic illustration of FIG. 4, the controller 44 selectively commands the actuators 42 to move the nozzle 40 between multiple static positions $S_1$, $S_2$, and $S_3$ that correspond to respective cross-sectional areas represented by $AR_1$, $AR_2$, and $AR_3$ and one or more discrete thrust reverse positions (e.g., $T_1$ and $T_2$) for reversing a direction of the bypass air flow discharged from the fan bypass passage 30. In this example, the cross-sectional areas $AR_1$, $AR_2$, and $AR_3$ correspond to the area between the nozzle 40 and the inner cowl 34. In other examples, the area may be defined by other portions instead of the inner cowl 34. As can be appreciated from the illustration, movement of the nozzle 40 to any of the positions $S_2$, $S_3$, $T_1$, or $T_2$ produces an opening 70 between the nacelle 28 and the nozzle 40. However, given this description, one of ordinary skill in the art will recognize alternative designs wherein movement to the static positions $S_1$, $S_2$, and $S_3$ results in a different sized opening or no opening at all.

The term "static" as used to describe the positions refers to the nozzle 40 being in a stopped position relative to the nacelle 28, rather than in a continuously moving state (e.g., when the nozzle 40 moves between the positions). Given this description, one of ordinary skill in the art will recognize other static positions and thrust reverse positions than shown, to meet their particular needs.

In the illustrated example, the controller 44 selectively commands the actuators 42 to move one or both of the two sections 40a and 40b in response to one of a plurality of operational states of the gas turbine engine 10. In one example, the plurality of operational states includes a first operational state associated with an aircraft cruise condition and a second operational state associated with an aircraft landing condition. Generally, the aircraft cruise condition comprises relatively constant aircraft air speed at a relatively constant altitude. It is to be understood that other operational states may also benefit from using the nozzle 40. For example, the nozzle 40 may be used during ground maneuvers to spoil some of the thrust to thereby provide enhanced maneuvering control or reduce the need to use the aircraft's brakes.

In one example, the cruise condition corresponds to an internal engine speed of the gas turbine engine 10, such as the rotational speed of one or both of the rotors 22a, 22b, the fan 14, the compressors 16a, 16b, or the turbines 20a or 20b. In one example, the internal engine speed has an internal engine speed rating, such as a predetermined maximum rotational speed (e.g., determined during a design stage), and the aircraft cruise condition corresponds to the gas turbine engine 10 operating at less than 50% of the internal engine speed rating (e.g., 10%, 20%, 30%, 40%, etc.). Likewise, the landing condition also corresponds to the internal engine speed rating. In this example, the landing condition corresponds to the gas turbine engine 10 operating at more than 50% (e.g., 60%, 70%, 80%, 90%, etc.)) of the internal engine speed rating. This may vary depending on factors such as the type of aircraft and desired flight conditions, but generally less than 50% of the internal engine speed rating is needed to maintain a desired aircraft speed and altitude at cruise, and more than 50% is desired after touch-down for landing to generate more bypass air flow D for a relatively larger thrust reversing force. Alternatively, the landing condition corresponds to a signal from a landing sensor, such as a landing gear sensor that senses weight on a wheel of the landing gear.

In one example cruise condition, the controller 44 commands the actuators 42 to move one or both of the two sections 40a and 40b among the static positions $S_1$, $S_2$, and $S_3$ to achieve a desired cross-sectional area $AR_1$, $AR_2$, and $AR_3$. For example, a relatively larger cross-sectional area, such as $AR_1$, permits more bypass air flow D through the rear exhaust 36 and a relatively smaller cross-sectional area, such as $AR_2$ or $AR_3$, permits less bypass air flow D through the rear exhaust 36. This provides the benefit of controlling bypass air flow D and air pressure within the bypass passage 30 to, for example, provide enhanced conditions for operation of the fan 14 or other components associated with the bypass passage 30 and gas turbine engine 10.

For example, the gas turbine engine 10 is designed to operate within a desired performance envelope under certain predetermined conditions, such as cruise. For example, the fan 14 is designed for a particular flight condition—typically cruise at 0.8 Mach and 35,000 feet. The fan 14 is designed at a particular fixed stagger angle for an efficient cruise condition. The nozzle 40 is operated to influence the bypass airflow D such that the angle of attack or incidence on the fan 14 is maintained close to design incidence at other flight conditions, such as landing and takeoff, thus enabling a desired engine operation over a range of flight condition with respect to performance and other operational parameters such as noise levels. In one example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. In some examples, the nozzle varies a cross-sectional area associated with the rear exhaust 36 of the bypass passage 30 by approximately 20% to influence the bypass airflow D.

In response to landing, the controller 44 commands the actuators 42 to move one or both of the two sections 40a and 40b to one of the thrust reverse positions $T_1$ and $T_2$. In the thrust reverse positions $T_1$ and $T_2$, the sections 40a and 40b deflect a significant portion of the bypass air flow D in a forward direction, FD, through the opening 70 to generate a reverse thrust force for slowing the speed of the aircraft. The two different thrust reverse positions $T_1$ and $T_2$ and ability to independently move one or both of the sections 40a and 40b also provide the advantage of selecting a desirable angle of the forward direction FD relative to the centerline axis A, such as to avoid impingement of the ejected bypass air flow D upon an aircraft wing or aircraft tail (for tail mounted engines), or to avoid injection of the bypass air flow D into the gas turbine engine 10.

In the illustrated example, the nozzle 40 provides a variety of different thrust reversal options, depending on the selected thrust reverse position $T_1$ or $T_2$ and whether one or both sections 40a and 40b are moved to the thrust reverse positions $T_1$ or $T_2$. For example, moving both sections 40a and 40b to thrust reverse position $T_2$ deflects a first amount of the bypass air flow D in the forward direction FD to produce a first thrust reversing force. Moving both sections 40a and 40b to thrust reverse position $T_1$ deflects a second amount of the bypass air flow D that is less than the first amount to produce a second, lesser thrust reversing force. Moving only one of the sections 40a and 40b to thrust reverse position $T_2$ deflects a third amount of the bypass air flow D that is less than the second amount to produce a third, even lesser thrust reversing force. Finally, moving only one of the sections 40a and 40b to thrust reverse position $T_1$ deflects a fourth amount of the bypass air flow D that is less than the third amount to produce a fourth, lesser thrust reversing force. Thus, using multiple sections 40a and 40b and multiple thrust reversing positions enables control over the amount of thrust reversing force.

In the thrust reverse positions $T_1$ and $T_2$, and in some examples also in the static positions $S_1$, $S_2$, and $S_3$ (depending on the air flow in the particular gas turbine engine), a portion of the bypass air flow D bleeds into the bleed passage 62 (shown schematically in FIG. 4) as a bleed flow. Thus, instead of deflecting in the forward direction FD to provide thrust reversing force, the bleed flow continues to travel in an aft direction through the bleed passage 62. The bleed flow thereby reduces the thrust reversing force.

Optionally, as shown in FIG. 2, the inner cowl 34 includes flaps 63 that are pivotally coupled with the inner cowl 34. Actuators 64 are operable to move the flaps 63 radially outwards from a stowed position into the bypass passage 30. The actuators 64 are connected with the controller 44 such that the controller 44 selectively commands the actuator 64 to move the flaps 63 into or out of the bypass passage 30 to control the thrust reversing force. In the illustrated example, the controller 44 commands the actuator 64 to move the flaps 63 into the bypass passage 30 to completely block the bypass airflow D in combination with the sections 40a and 40b. That is, since the sections 40a and 40b have a different radius of curvature than the inner cowl 34, the sections 40a and 40b may not completely block the bypass airflow D. The flaps 63 provide the benefit of blocking additional portions of the bypass passage 30 that are not blocked by the sections 40a and 40b to increase the amount of bypass airflow D that is diverted forward for the thrust reversing force.

In one example, the flaps 63 are used in combination with movement of one or both of the sections 40a and 40b to a selected thrust reversing position $T_1$ or $T_2$ to provide the benefit of a variety of different thrust reversal settings. For example, different settings may be used, depending on the payload of the aircraft, type of aircraft, landing distance, or other factors. Thus, the disclosed example nozzle 40 provides functionality at a variety of different operational conditions, such as at cruise and landing, in combination with enabling a high degree of control over the amount of thrust reversing force.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A variable area fan nozzle for use with a gas turbine engine system, comprising:
   a nozzle having a cross-sectional area associated with a bypass air flow flowing in an aft direction through a fan bypass passage, the nozzle having at least one section that is selectively moveable between a plurality of positions for varying the cross-sectional area and at least one thrust reverse position, which is different from the plurality of positions, for reversing a direction of the bypass air flow from the fan bypass passage, and wherein the at least one section of the nozzle includes an inner wall bounding an outer diameter of the fan bypass passage and an outer wall outwards of the inner wall with respect to the fan bypass passage, with an open auxiliary passage extending between the inner wall and the outer wall, the open auxiliary passage extending between the inner and outer walls from an upstream forward opening to a downstream aft opening that opens in the aft direction to an exterior of the nozzle, the downstream aft opening located upstream of a trailing edge of the inner wall.

2. The variable area fan nozzle as recited in claim 1, wherein the at least one section consists of two sections.

3. The variable area fan nozzle as recited in claim 2, wherein each of the two sections is selectively independently moveable from the other of the two sections.

4. The variable area fan nozzle as recited in claim 1, wherein the at least one section is pivotable about a hinge.

5. The variable area fan nozzle as recited in claim 1, wherein the at least one section is moveably coupled with an aircraft nacelle section.

6. The variable area fan nozzle as recited in claim 1, wherein the at least one thrust reverse position comprises more than one discrete thrust reverse position.

7. The variable area fan nozzle as recited in claim 1, wherein the at least one section has two sections that are independently moveable from each other, each of the two sections being moveable between three discrete, static positions of the plurality of positions for varying the cross-sectional area and at least two discrete, static positions of the at least one thrust reverse position.

8. The variable area fan nozzle as recited in claim 1, wherein the outer wall is outside of the fan bypass passage.

9. The variable area fan nozzle as recited in claim 1, wherein the upstream forward opening is outwards, relative to the fan bypass passage, of the downstream aft opening when the nozzle is in an open one of the plurality of positions for varying the cross-sectional area.

* * * * *